Dec. 11, 1973    J. D. ASHLEY    3,778,515
LOW POLLUTION FOOD UNIT
Filed Dec. 17, 1970
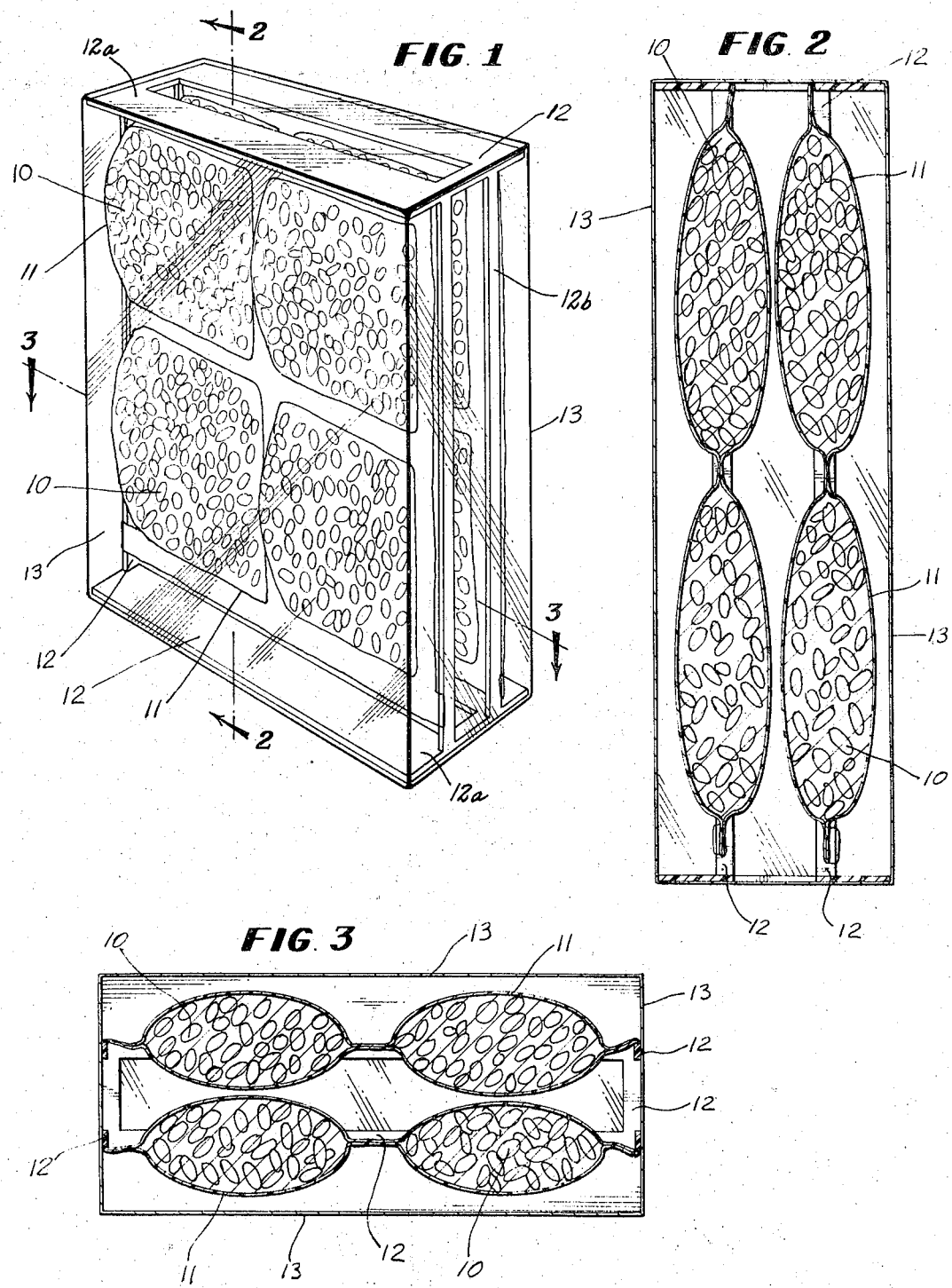
INVENTOR:
JAMES D. ASHLEY
By Donnie Rudd
ATTORNEY United States Patent Office 3,778,515
Patented Dec. 11, 1973

3,778,515
LOW POLLUTION FOOD UNIT
James D. Ashley, 939 Darlington Lane,
Crystal Lake, Ill. 60014
Filed Dec. 17, 1970, Ser. No. 99,210
Int. Cl. B65b 25/00
U.S. Cl. 426—108  2 Claims

ABSTRACT OF THE DISCLOSURE

A low pollution food unit is described comprising a ready-to-eat breakfast cereal completely enclosed in an edible milk soluble pouch. This package in in turn completely enclosed in a moisture-proof container.

BACKGROUND OF THE INVENTION

Field of the invention

This invention relates to a low pollution food unit comprising the integral combination of a ready-to-eat breakfast cereal with a new and unique packaging arrangement.

Description of the prior art

Pollution is increasingly becoming a worldwide concern. One problem that is now present is the multitude of packaging materials which must be disposed of in some manner. If the packaging materials are not degradable, the quantity of them at present levels of consumption will eventually present a problem which must be solved. Heretofore, ready-to-eat cereal packaging has consisted of an inner wrapping which is moisture-proof and is usually a metallic foil or some other such nondegradable material which is in turn enclosed in a stiff paper cereal box. While this type of packaging has been acceptable from a pollution free standpoint in the past, it is desirable to present new ideas and methods of avoiding even the minimum problems associated with the prior art.

SUMMARY OF THE INVENTION

It is an object of this invention to provide a low pollution food unit comprising a packaged ready-to-eat breakfast cereal.

The object of this invention is accomplished by a low pollution food unit comprising a ready-to-eat breakfast cereal completely enclosed in an edible milk soluble pouch, the edible milk soluble package thus formed being completely enclosed in a moisture-proof container.

The object of this invention is also accomplished by a low pollution food unit comprising a multiplicity of individual ready-to-eat cereal packages with each individual ready-to-eat cereal package comprising a ready-to-eat breakfast cereal completely enclosed in an edible milk soluble pouch, said multiplicity of individual ready-to-eat cereal packages being supported by a water soluble support and said supported packages being completely enclosed in a moisture-proof container.

In one embodiment of this invention individual portions of a ready-to-eat breakfast cereal are completely enclosed in an edible milk soluble package and then a number of those enclosed pacakges are further enclosed in a moisture-proof container ready for consumer sales. The moisture-proof container should be of the type that can be closed after removing an individual portion to prevent moisture from reaching the edible milk soluble package. The consumer will purchase a package of the smaller units and when ready for consumption will remove the individual portion which is packaged in the edible milk soluble package, place it in the cereal bowl, and add milk thereto. When the milk is added to the packaged product, the package will dissolve and the consumer will eat the entire contents in the same manner that a cereal product is normally consumed. If the milk soluble package is made of a suitable material it can assist in providing the energy requirements of the product. Since a portion of the packaging material is being consumed, less material will eventually find its way into place where it creates a waste disposal problem.

In a similar embodiment of this invention the individual portions which are packaged in an edible milk soluble pouch are then supported by a water soluble support and the supported units are completely enclosed in a moisture-proof container. In this embodiment the water soluble support is used to provide an outer shape substantially the same as a standard cereal box. This support is then enclosed by a moisture-proof container which can be a clear material such as cellophane or polyethylene film. In this embodiment the product is consumed as was discussed above but when the product is completely used the water soluble support may be disposed of by pouring water over it or by allowing it to come in contact with water during the disposal process.

Among the edible milk soluble pouches that may be used in this invention are the high amylose corn starch, flexible edible films made by the American Maize-Products Company, New York, N.Y. These products are said to be hydroxypropylated amylomaize starch films and are soluble in milk and edible. Another product which may be used as the milk soluble packaging material is produced by the Gilbreth Company of Philadelphia, Pa. and sold under the trademark Dissolvo. While this product is still to be considered for its desirability as being edible in quantities, it nevertheless is operable in this invention. Still another product which may be used as the edible milk soluble package of this invention is food grade Klucel, a hydroxypropyl cellulose produced by Hercules, Incorporated, Wilmington, Del. A further description of this product may be found in a booklet entitled "Chemical and Physical Properties, Hercules Klucel Hydroxypropyl Cellulose, copyright, 1968 by Hercules, Incorporated. Also other examples of edible food pouches which may be used for the inner layer may be found in U.S. Pats. 3,062,664, 3,527,646, and 3,529,530.

Any of the above packaging materials may be used as the water soluble support providing the material can be formed and densified to the strength necessary to support the package. The Klucel material is particularly well adapted for this use.

BRIEF DESCRIPTION OF THE DRAWING

This invention may be more fully described but is not limited by the enclosed drawing in which:

FIG. 1 is a perspective view of the preferred embodiment of this invention;

FIG. 2 is a cross-sectional view taken along the line 2—2 of FIG. 1; and

FIG. 3 is a cross-sectional view taken along the line 3—3 of FIG. 1.

In the drawings I have used the numeral 10 to illustrate a ready-to-eat cereal product. The ready-to-eat cereal product 10 is enclosed in an edible milk soluble pouch 11. A multiplicity of these packages are in turn supported by a rigid water soluble support 12. The support includes a top and bottom member 12a and at least one apertured elongated member 12b extending therebetween for supporting each of the packages within the aperture in juxtaposed relationship. The supported packages are in turn covered completely by a moisture-proof container 13. If desired, the moisture-proof container 13 may contain the labeling and advertising customarily associated with such products.

DESCRIPTION OF THE PREFERRED EMBODIMENTS

The enclosed drawings illustrate the preferred embodiments of this invention and include the embodiment wherein a water soluble support is used.

I have clearly illustrated a new and unique invention wherein a ready-to-eat cereal product is provided for the consumer and wherein pollution due to packaging materials is substantially minimized.

Having fully described this new and unique invention, I claim:

1. A low pollution food unit comprising a multiplicity of individual ready-to-eat flexible, non-self supporting cereal packages with each individual ready-to-eat cereal package comprising an edible, cold milk soluble pouch and a ready-to-eat breakfast cereal completely enclosed therein, the food unit further comprising water soluble support means including top and bottom members and at least one apertured elongated member extending therebetween for supporting each of said non-self supporting packages within said aperture in juxtaposed relationship, said supported packages and said support being completely enclosed in a moisture proof plastic film, said support and film providing an outer box-like shaped food unit.

2. A low pollution food unit as in claim 1 wherein the water soluble supports are edible, milk soluble supports.

References Cited

UNITED STATES PATENTS

| | | | |
|---|---|---|---|
| 3,549,619 | 12/1970 | Mark et al. | 99—171 LP X |
| 1,529,670 | 3/1925 | Pritchard et al. | 220—Dig. 30 UX |
| 3,272,328 | 9/1966 | Krzyanowski | 206—45.33 X |
| 1,761,111 | 6/1930 | Doty | 220—Dig. 30 UX |
| 3,238,100 | 3/1966 | Meyer et al. | 99—77.1 X |
| 3,130,081 | 4/1964 | Evans | 99—171 LP X |
| 2,982,394 | 5/1961 | Novak | 99—171 LP X |
| 3,529,530 | 9/1970 | Tsuzuki | 99—171 LP X |
| 3,395,025 | 7/1968 | Hermanson | 99—171 H |
| 2,836,291 | 5/1958 | Stroop | 99—171 LP X |
| 3,695,989 | 10/1972 | Albert | 99—17 LP X |

OTHER REFERENCES

Modern Packaging Encyclopedia issue, vol. 41, #7A, July 1968, McGraw Hill, pp. 185, 186.

Food Packaging, Sacharow & Griffin, AVI Publish., 1970, May 22, 1970, p. 41.

Hercules, "Klucel," Hydroxypropyl Cellulose, Chem. & Phys. Prop., Hercules Inc., 1968.

FRANK W. LUTTER, Primary Examiner

S. L. WEINSTEIN, Assistant Examiner

U.S. Cl. X.R.

206—45.14, 45.33, 46 F; 220—Dig. 30; 426—112, 130, 208

UNITED STATES PATENT OFFICE
CERTIFICATE OF CORRECTION

Patent No. 3,778,515            Dated December 11, 1973

Inventor(s) James D. Ashley

It is certified that error appears in the above-identified patent and that said Letters Patent are hereby corrected as shown below:

In the list of the inventor on the cover sheet insert --assignors to The Quaker Oats Company, Chicago, Illinois, a Corporation of New Jersey--.

Signed and sealed this 30th day of April 1974.

(SEAL)
Attest:

EDWARD M. FLETCHER, JR.
Attesting Officer

C. MARSHALL DANN
Commissioner of Patents